April 24, 1928.

C. THELANDER 1,667,570

MANICURING IMPLEMENT

Filed March 24, 1927

INVENTOR
Cess Thelander
BY
ATTORNEY

Patented Apr. 24, 1928.

1,667,570

UNITED STATES PATENT OFFICE.

CESS THELANDER, OF NEW YORK, N. Y.

MANICURING IMPLEMENT.

Application filed March 24, 1927. Serial No. 177,941.

This invention relates generally to manicuring implements, and has more particular reference to a novel holding device for a glass nail scraper as generally used in the art of manicuring.

The particular glass nail scraper referred to is usually held manually by the manicurist and thus manipulated. The invention has for an object the provision of a novel holding device for the scraper, and of such shape as to be conveniently handled by the manicurist, eliminating the necessity of manually holding the scraper itself, which because of its size and shape is hard to handle.

Furthermore, the invention has for an object the provision of a device of the class described, which can be manufactured and sold at a reasonable cost.

For further comprehension of the invention and of the objects and advantages thereof, reference will be had to following description and accompanying drawings, and to the appended claims in which the various novel features of the invention are more particularly set forth.

Referring to the drawing forming a material part of this disclosure:

Figure 1:
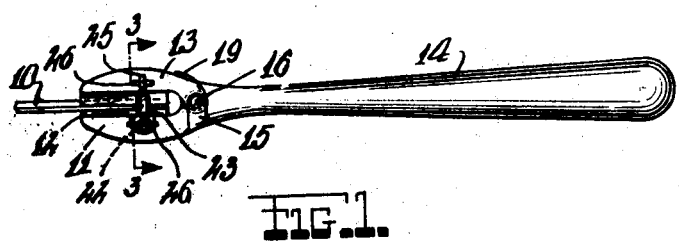
Fig. 1 is a side view of a device constructed according to this invention.

The reference numeral 10 indicates generally an ordinary glass nail scraper as used by manicurists, though this invention is not limited necessarily to a glass scraper. This scraper 10 is clamped by a jaw formed by a stationary jaw member 11 having certain padding material 12 secured thereto, and a movable jaw member 13 also having certain padding material 12 secured thereto.

Figures 3, 4:
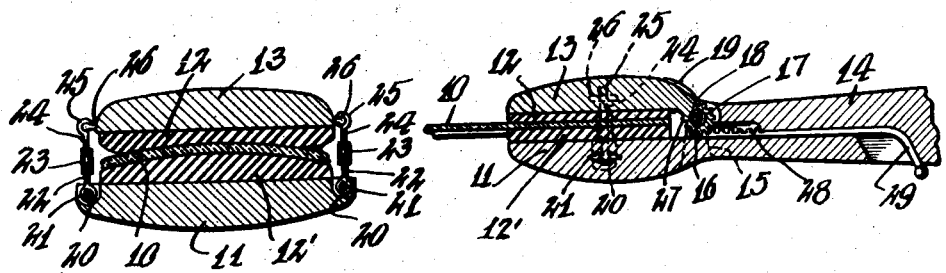
Fig. 3 is a vertical sectional view, taken on the line 3—3 of Figure 1.
Fig. 4 is a central longitudinal fragmentary sectional view of a device constructed according to a modification of the invention.

As illustrated in Fig. 3, the upper surface of pad 12 is convex and the lower surface of the pad 12' is concave, thus providing a space between the two pads which is adapted to accommodate a scraper of arcuate curvature. When the scraper 10 comprises jaws it is essential that pads be formed as above in order that the pressure exerted by the jaws will not be applied unevenly on the scraper and break the same. A scraper of arcuate curvature is particularly advantageous because of the ease with which a curved scraping edge can be formed thereon which will conform to the curvature of a finger nail.

The stationary jaw member 11 is integral with a neatly shaped handle 14 and this jaw also has standards 15 projecting therefrom, with a pin 16 fixed between the standards. The movable jaw member 13 has an aperture 17 with a spring 18 therein, and is coaxially mounted on the pin 16 which passes through the center of the spring 18. One end of the spring 18 has an integral extended portion 19 abutting against the jaw 13 while the other end of the spring is fastened to one of the standards 15, thus normally urging the jaw 13 towards the jaw member 11.

The member 11 is formed with a cavity 20 provided with a transverse pin 21. A rod 22 is pivoted to the pin 21 at its bottom end, and formed at its top end with left hand threads engaged with the left hand threads in coupler 23 provided also with right hand threads engaged by threads on the bottom end of rod 24. The top of the rod 24 is provided with a catch 25 engageable with a complementary element 26 secured to the movable jaw member 13. The coupler 23 may be adjusted so that any desirable gripping pressure may exist between the jaw members 11 and 13 when the catches 25, 26 engage each other.

In the modification of the invention illustrated in Figure 4, the movable jaw member 13 is provided with teeth 27 near its pivotal end, and formed concentric with its pivot point, and meshing with these teeth is a rack 28 having a handle portion 29 extending through a portion of the handle 14, and arranged to be moved, so that upon forward motion, the movable jaw member 13 will be opened relative to the stationary jaw member 11, provided of course that the catches 25, 26 are disengaged.

Figure 2:
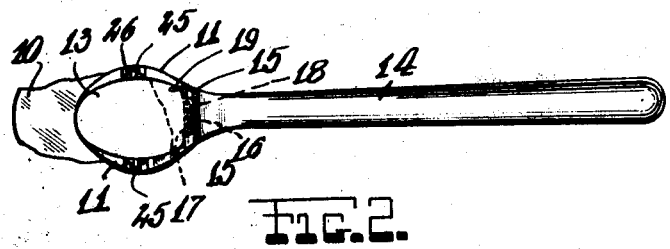
Fig. 2 is a plan view thereof.

In the operation of the species illustrated in Figures 1 to 3, the movable jaw member 13 is manually raised against the action of spring 18, the scraper 10 inserted between the jaws which are allowed to close, and then the catches 25, 26 are engaged to lock the scraper 10 in place.

In the species of the invention illustrated in Figure 4 instead of manually opening the movable jaw member 13, the handle 29 is moved forward to accomplish this operation.

While I have illustrated and described the preferred form, construction and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention what I claim as new and desire to secure by United States Letters Patent is:

1. In combination with a nail scraper of arcuate curvature for manicuring purposes, a means comprising an upper gripping member having a concave surface and a lower gripping member having a convex surface for gripping the same.

2. A device of the class described, comprising a handle, a stationary jaw member integral therewith, a movable jaw member coactable with the stationary jaw member and pivotally mounted on the stationary jaw member, a pad having an upper convex surface on said stationary jaw member, a pad having a lower concave surface on said movable jaw, and means for clamping the jaw members in closed position.

3. A device of the class described, comprising a handle, a stationary jaw member integral therewith, a movable jaw member coactable with the stationary jaw member and pivotally mounted on the stationary jaw member, a pad secured to one of said jaws having a convex surface, a pad secured to the other jaw having a concave surface, means for normally urging the jaw members together, and means for clamping the jaw members in closed position for retaining the concave and convex surfaces of said pads in close proximity.

4. A device of the class described, comprising a handle, a stationary jaw member integral therewith, a movable jaw member coactable with the stationary jaw member, and pivotally mounted to the stationary jaw member, and means for clamping the jaw members in closed position consisting of bars joined by a coupler, and means permitting of making certain length adjustments, one end of the joined bars being pivotally connected to the stationary jaw, and the other end being adapted to be secured to the movable jaw.

5. A device of the class described, comprising a handle, a stationary jaw member integral therewith, a movable jaw member coactable with the stationary jaw member, and pivotally mounted to the stationary jaw member, padding means secured to the jaw members, means for normally urging the jaw members together, teeth formed on the movable jaw concentric with the pivot point thereof, a rack meshing with the teeth, a handle projecting from the rack through a portion of the first mentioned handle and adapted to be moved so as to be capable of moving the movable jaw to open position, and means for clamping the jaw members in closed position.

6. The combination with a glass nail scraper of arcuate curvature for manicuring, of a pair of pivotally connected jaw members, a pad on one of said jaw members having a convex surface adapted to conform to the curvature of one side of said scraper, a pad on the other jaw member having a concave surface adapted to conform to the curvature of the other side of said scraper, and means on said jaw member for resiliently urging one pad thereof in the direction of the other pad for firmly gripping said scraper therebetween.

7. In a device of the class described, a stationary jaw member, a movable jaw member pivotally attached thereto, a pad on said stationary jaw member having a convex surface, a pad on said movable jaw member having a concave surface, a scraper having an arcuate curvature disposed between said pads and adjustable clamping member attached to one of said jaws adapted to engage the other jaw for retaining the same in a predetermined position to firmly grip said scraper between said pads.

8. In a device of the class described, a tool comprising pivotally attached jaws, a pad on one of said jaws having a concave curvature, a pad on the other jaw having a convex curvature, and a finger nail scraper comprising a glass member of arcuate curvature adapted to be formed with a concaved scraping edge disposed between said pads, the concave and convex surfaces of said pads being adapted to conform to the curvature of the concave and convex sides respectively of said scraper.

In testimony whereof I have affixed my signature.

CESS THELANDER.